United States Patent [19]

Leffel et al.

[11] Patent Number: 4,730,444
[45] Date of Patent: Mar. 15, 1988

[54] AIR SEAL FOR PREVENTING SEED LOSS IN CROP PICKUP MECHANISM

[76] Inventors: Leon E. Leffel, 2743 1st St.; Rick G. Leffel, 2723 W. 1st St., both of Yuma, Ariz. 85364

[21] Appl. No.: 855,144

[22] Filed: Apr. 23, 1986

[51] Int. Cl.⁴ .............................................. A01D 57/28
[52] U.S. Cl. ......................................... 56/13.1; 56/12.9
[58] Field of Search ................... 56/12.8, 12.9, 13.1, 56/13.2, 19 L

[56] References Cited

U.S. PATENT DOCUMENTS

| | | | |
|---|---|---|---|
| 2,710,516 | 6/1955 | Kaesemeyer, Jr. et al. | 56/158 |
| 2,990,019 | 6/1961 | Finn | 171/89 |
| 3,073,098 | 1/1963 | Farrar et al. | 56/19 |
| 3,165,874 | 1/1965 | Osteen | 56/23 |
| 3,193,995 | 7/1965 | Miller | 56/21 |
| 3,456,652 | 7/1969 | Louks et al. | 130/27 |
| 3,665,687 | 5/1972 | Hatton | 56/12.9 |
| 3,693,331 | 9/1972 | Richter et al. | 56/13.2 |
| 3,720,050 | 3/1973 | Rozinska | 56/330 |
| 3,760,573 | 9/1973 | Porter | 56/12.9 X |
| 3,828,531 | 8/1974 | Quick | 56/12.9 |
| 3,964,245 | 6/1976 | Hecht | 56/331 |
| 4,364,222 | 12/1982 | Ramachi | 56/12.8 X |
| 4,406,112 | 9/1983 | Brooks | 56/12.9 |

FOREIGN PATENT DOCUMENTS 1580359 12/1980 United Kingdom .................. 56/12.9

Primary Examiner—George A. Suchfield
Attorney, Agent, or Firm—Cahill, Sutton & Thomas

[57] ABSTRACT

A high speed blower feeds airstreams to a plurality of lower ducts that produce sheets of high velocity lower air stream moving upward through various gaps in a rake plate through which tines of a rotary pickup drum pass as the drum lifts a windrow of dry, brittle sesame seed crop, creating a lower "air seal" that prevents loss of large numbers of sesame seeds that pop out of the dry pods as a result of snapping and cracking of the dry crop material. The air seal prevents the seeds from falling through the gaps to the ground. The blower also feeds a plurality of upper ducts that produce a high velocity air stream flowing rearward over the upper surface of the matt, intercepting large numbers of sesame seeds that pop outward and upward from the pods and otherwise would be lost as a result of the snapping and cracking of the dry crop material.

14 Claims, 7 Drawing Figures

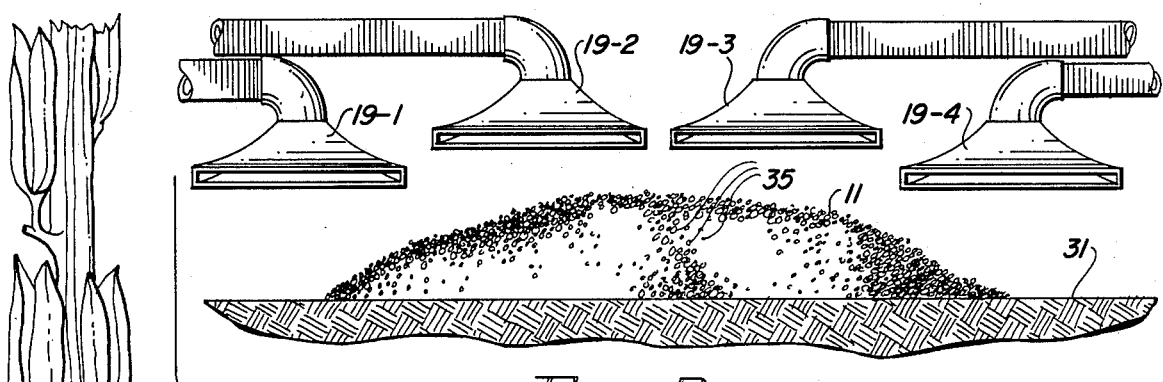
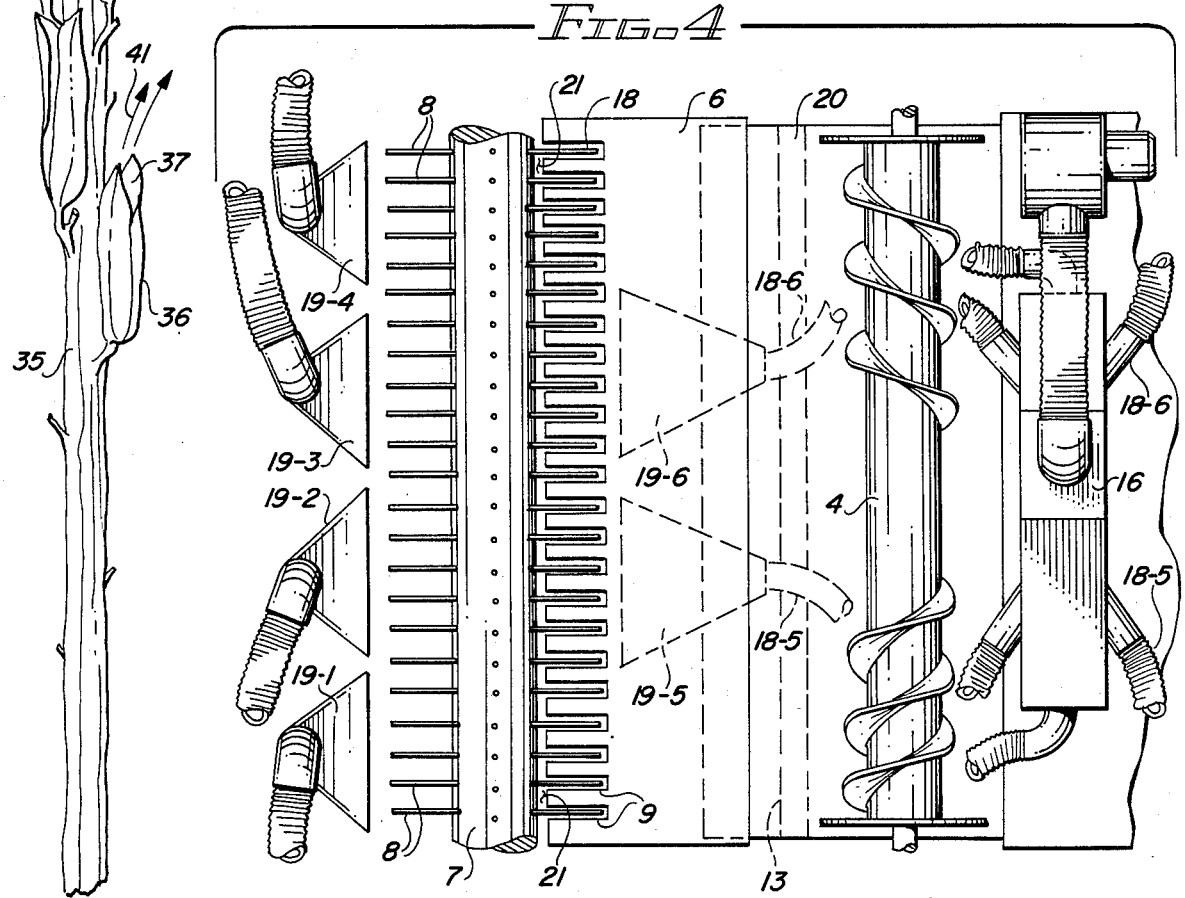
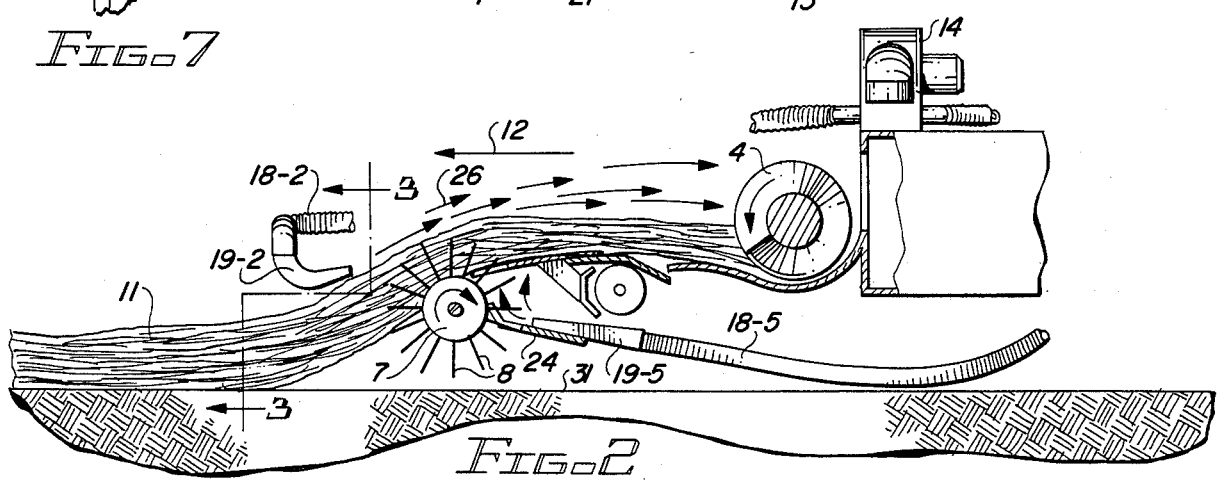

AIR SEAL FOR PREVENTING SEED LOSS IN CROP PICKUP MECHANISM

BACKGROUND OF THE INVENTION

The invention relates to apparatus for harvesting seed crops, such as sesame seed, blue grass seed, mustard seed, etc., that generally are harvested after the stems and pods become dry and brittle, and more particularly to apparatus used in conjunction with conventional crop pickup mechanisms for large commercial harvesting machines.

A variety of large commercially-available harvesting machines, such as the John Deere 7700 are widely used for arvesting seed crops. Various crop pickup mechanisms, such as a Model 980 manufactured by the Renn Company or a Model 8-N-R30001 or Model C-50001 manufactured by the Allis Chalmers Company for picking up windrows of previously swathed crop material, are attached to the front end of such commercial harvesters. The crop pickup mechanisms typically include a large horizontal pickup drum having a large number of radial 6 inch tines. The pickup drum is positioned a few inches above the ground and rotates so that its teeth engage the matt of crop material consisting of the windrow and lift it up over the top of the rearwardly rotating pickup drum as the harvester moves forward against the windrow, sliding the lifted windrow over a smooth surfaced "rake plate" having rectangular gaps therein through which the tines pass. The plates of the rake plate have a small clearance (about five-eighths of an inch) to the smooth surface of the drum rom which the tines extend. The pickup machines typically include a small, smooth-surfaced horizontal "assist roller" located rearward of the rear edge of the rake plate assembly, to assist the matt of crop material over the gap between the rake plates and the floor of an auger housing of an auger assembly. The auger assembly gathers the windrow and feeds it through a "window" into the interior of the harvesting machine.

While such harvesting machines and crop pickup mechanisms are widely used and have been very successful in harvesting some crops, they have not been nearly as effective as would be desirable in harvesting other crops, for example, sesame seed and other small seed crops, because such machines have been unable to prevent loss of a large proportion of the seeds, which fall out or pop out of their pods as a result of the "rough handling" they experience as the windrow is engaged and lifted by the tines of the rotating pickup drum. Many seeds fall through the gaps between the rake plates, and still more fall through the gaps between the assist roller and the rake plate and also the gaps between the assist roller and the auger housing. In the case of sesame seeds, a large proportion of the seeds simply pop out of the pods, fly into the air in various directions and fall to the ground before they reach the auger housing.

For many crops, including sesame seeds, the swathed windrows are not picked up until the stems and pods become very dry and brittle, because if the crop material is not dry, there may be a severe problem of flexible stem material becoming entangled in and wrapped around the tined pickup drum as it rotates, making the machine inoperable. By the time the stems and pods of sesame become dry enough to be picked up by the conventional crop pickup mechanisms, all of the pods, which are located along the entire 3 to 7 foot lengths of the sesame stems, become naturally opened. The internal "placenta", a fine membrane which retains the seeds in the pods when the plant material is moist, has completely deteriorated by the time the sesame plant is dry enough to harvest. The tiny sesame seeds, which are less than one-eighth of an inch long, are so loosely held in the pods that simply inverting the stalk will cause nearly all of the seeds to fall to the ground. In fact, the harvesting of sesame seeds, for which there is a large worldwide market, has been so difficult that until very recently, the world need for sesame seeds was all supplied by "third world" countries, wherein labor is sufficiently inexpensive that sesame seeds are harvested by hand, using the technique of placing an inverted bag over each stalk, closing the neck of the bag about the stem of the plant, cutting the stem, and then inverting the bag with the stem in it to collect the sesame seeds. It should be noted that the mechanical shock that is transmitted to the pods by cutting the stem (without the bag over it) is great enough to cause a very large number of the sesame seeds to be ejected from their pods and lost even before the stem is inverted.

Early attempts to harvest sesame seeds using the above-mentioned conventional harvesters and crop pickup attachments resulted in very large losses of the seed crop, varying from 50 percent to 90 percent of the total crop.

There clearly has been a need for an effective mechanical system for harvesting sesame seeds without loss of a large portion of the seed crop.

Aware of these considerations, we attempted to find improved ways of harvesting sesame seeds as long as about five years ago. Our first efforts were to find experts in the field of designing blower machines for use in agricultural equipment. After being advised by experts in this area that preventing seed loss by use of blower attachments to conventional harvesting equipment was not commercially practical, we devised and tested a series of experimental devices, which after approximately four years of development, evolved into the present invention, which finally does result in a tremendous reduction in the loss of sesame seeds.

SUMMARY OF THE INVENTION

Accordingly, it is an object of the invention to provide an apparatus and method for avoiding loss of seeds that become separated from dry husks during feeding of dried stem and pod material into a harvester.

It is another object of the invention to provide a technique and apparatus for utilizing controlled airstreams in conjunction with commercially available windrow pickup machines to prevent seeds shaken from pods during pickup from falling to the ground through various gaps in the machine.

It is another object of the invention to provide a method and apparatus for directing separated seeds falling from a windrow that is picked up and fed into an auger of a harvester so that the separated seeds also move into the harvester.

Briefly described, and in accordance with one embodiment thereof, the invention provides a method and apparatus for use in conjunction with a windrow pickup mechanism for producing an "air seal" that prevents separated seeds from passing through gaps in a rake plate providing clearance for tines of a rotary pickup drum by forcing one or more thin, high speed sheets of air between the gaps in the rake plate and the gaps between the pickup drum and the rake plate, and also producing one or more high speed sheets of air that flow substantially directly over and parallel to the upper surface of the windrow as it moves over the tined pickup drum and the rake plates into a receiving mechanism of a harvester. The high speed sheet of air essentially instantly intercepts large numbers of seeds shaken out of pods in the crop material by mechanical shock resulting from snapping of brittle stems and the like or as a result of upward jets of air produced by the air seal, and blows the intercepted seeds into the harvesting machine. In the described embodiment of the invention, a high speed blower producing at least 3,000 cubic feet of air per minute is fed into a manifold containing internal adjustable baffles that direct the air to a plurality of outlets without pressure buildup. Each of the outlets is coupled by a flexible hose to one of two lower ducts each having a thin, rectangular outlet that guides the high speed sheet of air toward the upper portion of the pickup drum. A lower rake plate, having individual members spaced by gaps through which tines of the picked up matt of crop pass, is attached to the lower lip of each of the lower ducts. Each of the members is bent upward to form a guide that deflects the sheets of air from the lower ducts upward through the various gaps in the upper rake plate of the crop pickup mechanism, preventing separated seeds from falling through such gaps. A portion of the air sheet is deflected through other gaps in the crop pickup mechanism. A metal seal provides a continuous, gap-free floor between a rear edge of the rake plate and the forward edge of an input of an auger housing of the harvesting machine. The remaining outlets of the manifold feed the high speed streams of air to a plurality of ducts adjustably positioned above and forward of the rotary pickup drum, and oriented so that thin sheets of high speed air "skim" over the top of the windrow as it is fed into the auger, intercepting seeds separated from the matt and propelled upwardly and carrying the intercepted seeds into the auger housing. In harvesting sesame seed crop, improvements of 20 percent to more than 45 percent in the crop yield have been realized by avoiding loss of seeds by falling to the ground before reaching the auger housing.

BRIEF DESCRIPTION OF THE DRAWINGS

FIG. 2 is a partial section view diagram of the machine in FIG. 1.

FIG. 3 is a section view taken along section line 3—3 of FIG. 2.

FIG. 4 is a partial top view diagram of the machine of FIG. 1 illustrating the placement of upper and lower ducts relative to a pickup drum and auger assembly thereof.

FIG. 7 is a partial elevation view of a dried sesame seed stalk in the windrow shown in FIG. 2.

DESCRIPTION OF THE INVENTION

Figure 1:
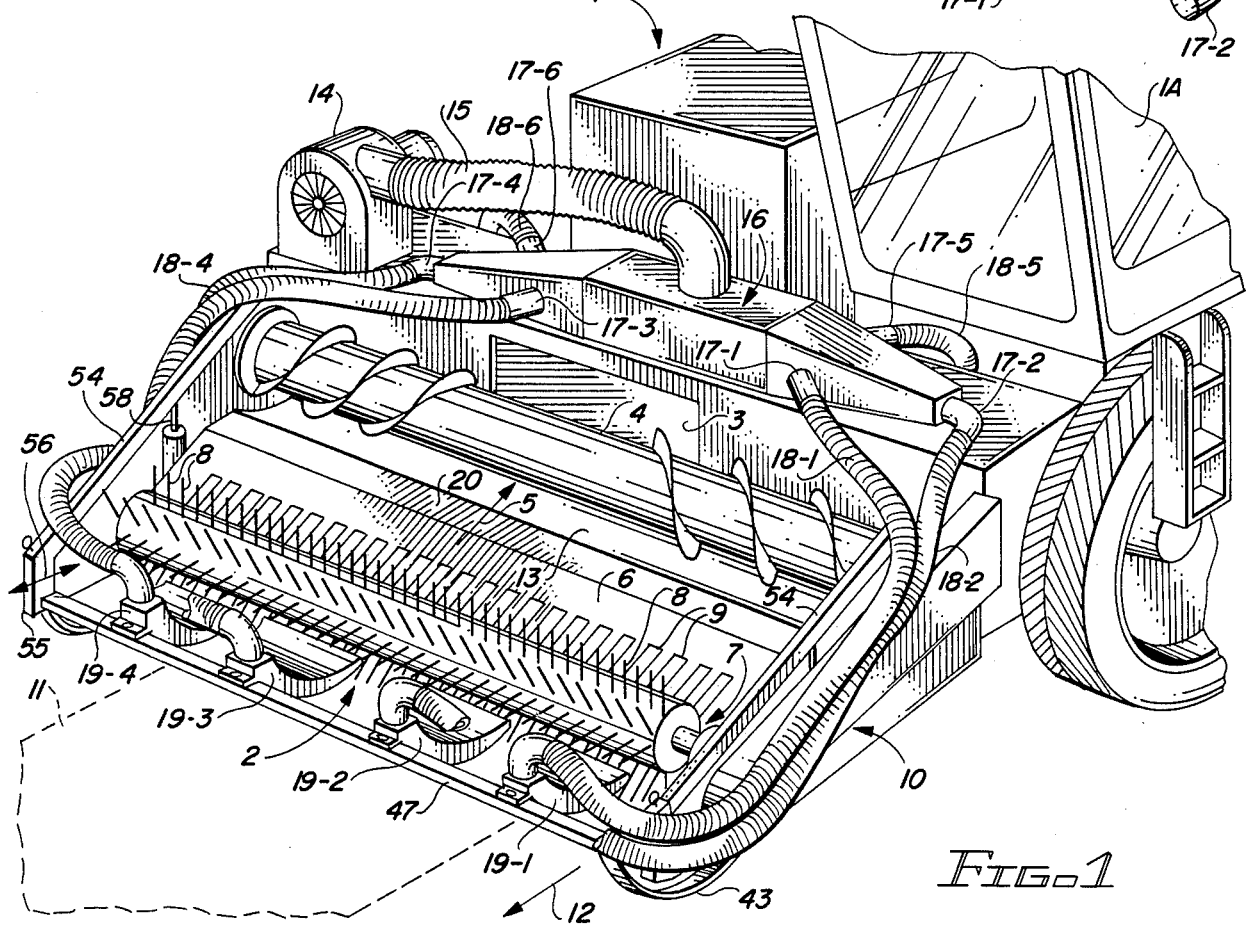
FIG. 1 is a partial perspective view of a harvesting machine and crop pickup with the air seal system of the present invention attached thereto.

Referring now to the drawings, particularly FIG. 1, a harvesting machine 1, which can be a John Deere grain/seed combine Model 7700 or a Model 8820, or the like, has attached thereto a crop pickup mechanism 10, which can be a Model 980 manufactured by Renn Manufacturing Co. of Canada. Pickup mechanism 10 includes a rotary pickup drum having a large number of radial tines 8 extending from a precisely cylindrical drum surface. Pickup 10 includes an upper rake plate 6 having a plurality of slots 9 therein through which the tines 8 pass as the drum rotates clockwise, as viewed in FIG. 1. Pickup mechanism 10 also includes an auger 4 in an auger housing 13 into which crop material of a picked up windrow is fed. The auger 4 rotates counterclockwise, as viewed in FIG. 1, to funnel the crop material that is picked up by tines 8, fed across rake plate 6, and into auger 4, into a "window" opening 3 of the harvesting machine 1 as it moves "against" windrow 11 in the direction of arrow 12.

Rake plate 6 is attached to a rake mount 2 by means of rivets. Rake mount 6A is supported by a rake frame 6B. Seal plate 20 is riveted by pop rivets to the underside of the rear edge of rake plate 6. The rear edge of rake plate 6 completely exposes the upper portion of assist roller 23, so that it can assist in feeding crop material perpendicularly into the auger. Seal plate 20 has a bend of approximately 30° at its midpoint, directly over assist roller 23. The assembly including pickup drum 7, rake plate 6, rake mount 6A, rake frame 6B, lower ducts 19-5 and 19-6, and lower rake plate 24 all can be pivotally raised and lowered under the control of the harvester operation. The pivoting occurs about a pivot axis coaxial with the axle of assist roller 23, subsequently described.

Windrow 11 consists of a "matt" of directionally swathed dry, brittle sesame seed stems such as 35 in FIG. 7, each having a large number of pods 36 thereon. FIG. 3 shows a cross-section of a typical windrow 11. Of course, other seed crops than sesame seed can be swathed to provide windrows, which then can be harvested by the machine of the present invention.

Those skilled in the art know that sesame seeds and other seed crops must be dried before the windrows can be harvested. By the time that the sesame dries sufficiently for harvesting, the stems 35 become very brittle, as do the pods 36. The pods naturally open as they dry, and the "placenta" membrane that retains the seeds within the pod during growth completely deteriorates. By the time the pods are harvested, the seeds are so loose that they rattle around in the pods, and if the pod is inverted, nearly all of the seeds will simply fall out.

As the harvesting machine 1 moves forward in the direction of arrow 12 in FIG. 1, with the Renn crop pickup attached thereto, the mechanical stresses and shocks in the stems and pods caused by lifting the windrow 11 up by the tines 8 of pickup drum 7 as shown in FIG. 2, causes the dried sesame seeds to virtually "explode" and fly out of the pods, upward, to the right, to the left, and even forward in the direction in which the harvesting machine 1 is moving. As previously mentioned, until the present invention was developed, it was simply impractical to harvest sesame seeds because typically about 20 to 65 percent of the available seeds fell to the ground, either by being tossed to the right or left, or falling to the ground through the gaps between the auger housing and the rotary drum or through the gaps in the rake plate.

To prevent such loss of seed, we devised and tested a series of experimental machines, finally arriving at the one shown in the drawings, using high velocity sheets of air to deflect upwardly and outwardly propelled sesame seeds from the windrow into the auger 4, and also to force air upward through the various gaps between the rake plate 6 and the rotary pickup drum 7 and also between the rear edge of the rake plate and the front edge of the auger housing 13.

The blower system of the present invention includes a high speed blower 14, which can be an American Fan Company Model AF15, which is capable of producing high velocity airstreams of greater than 3,000 cubic feet per minute. Our experimental machines drove blower 14 at various RPM by means of a controllable hydraulic motor, although the upcoming production version of the blower system will be mechanically driven by means of a belt connected to an available drive shaft of the John Deere harvesting machine 1. The outlet of blower 14 is 8 inches in diameter, and is connected by means of a steel ribbed plastic 8 inch diameter hose 15 to an 8 inch inside diameter elbow connected to the central portion of a manifold 16. (Note that all air passage dimensions given herein are inside dimensions.)

Manifold 16 has right and left sections which are symmetrical relative to the elbow, and has six 3 inch inside diameter outlets from each symmetrical portion. Manifold outlets 17-1 and 17-2 are connected by plastic 3 inch flexible hoses 18-1 and 18-2 to 3 inch inside diameter elbow inlets of upper ducts 19-1 and 19-2, which are rigidly supported on a rod 47, ideally about 2 feet forward of rotary pickup drum 7, as shown in FIGS. 1, 4, and 5.

For harvesting seed crops wherein the plant mass is less than average, the support rod 47 can be moved toward pickup drum 7 so that the upper ducts are as close as about one foot to it. Bar 47 is supported at its opposite ends by a pair of movable end brackets 55. End brackets 55 are supported by rods that "telescope" into arms 54, which, along with pickup drum 7 can be lowered or raised by the harvester operation.

The elevation of upper duct support bar 47 relative to the ground surface can be controlled by the driver of harvester 1 from the operating console by means of a pair of hydraulic cylinders 58 to raise or lower arms 54 independently of the heighth of pickup drum 7. This allows the operator to raise the upper ducts in accordance with the heighth and/or characteristics of the windrow crop material being harvested. And, of course, the heighth of the crop pickup rotary drum 7 also can be adjusted from the operator's console, and is conventional for crop pickups made by Renn and others.

Figure 5:
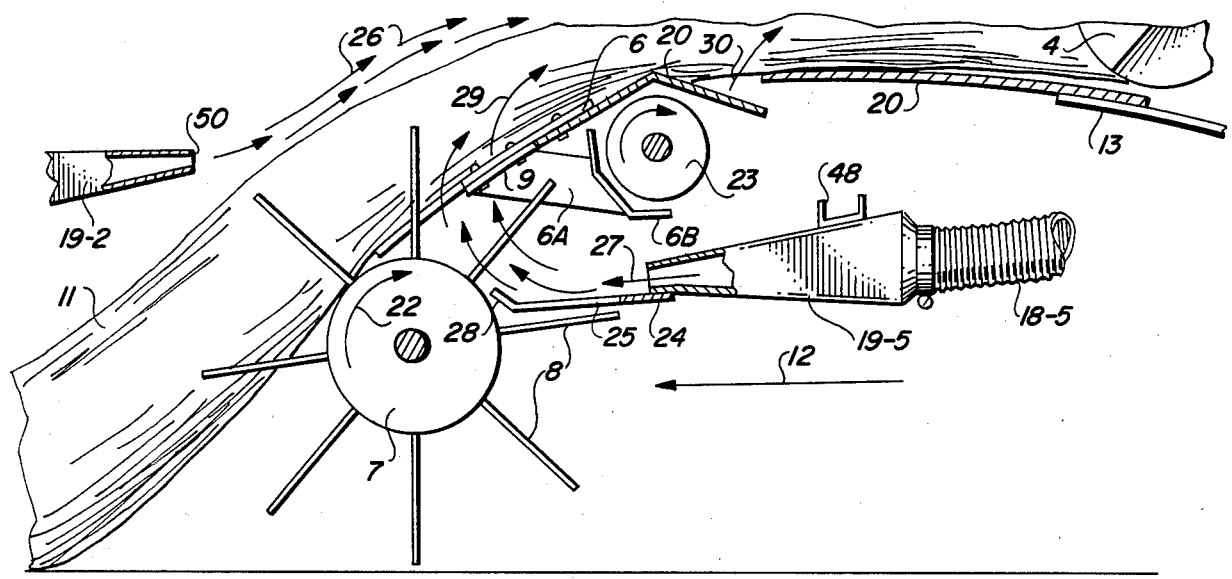
FIG. 5 is a partial enlarged section view useful in explaining the operation of the invention.

Outlet 17-5 is connected by steel reinforced flexible hose 18-5 to a lower duct 19-5, as shown in FIGS. 4 and 5. On the left side of manifold 16, outlet 17-3 and 17-4, which are symmetrically positioned relative to outlet 17-1 and 17-2, respectively, are connected by 3 inch plastic flexible hoses 18-3 and 18-4 to 3 inch elbow inputs to upper ducts 19-3 and 19-4, respectively. Rear outlet 17-6, which is positioned symmetrically relative to outlet 17-5, is connected by steel reinforced flexible hose 18-6 to a second lower duct 19-6, as shown in FIG. 4.

The four upper ducts 19-1 to 19-4 each have a gradually curved configuration as best shown in FIG. 5. The 3 inch diameter round inlet flares gradually out and rearward to form a long horizontal rectangular outlet slot 50 that is one-half of an inch high by 16 inches long. Each of the upper ducts is located sufficiently far forward of pickup drum 7 and sufficiently far above it that the resulting sheet of air, designated by arrows 26 in FIGS. 2 and 5, effectively "skims" over the portion of the upper surface of windrow 11 from which sesame seeds first begin to be thrown as a result of the above-mentioned shock resulting from stresses in the "transition" portion of the windrow 11 due to the action of tines 8 of the pickup drum 7.

Preferably, the jet or sheet of air coming from the nozzle of each of the upper ducts is located only a few inches above the curved upper surface of the windrow 11 where the seeds first begin to be thrown outward. The amount and velocity of the sheet of air 26, which can be thought of as being produced by all four of the upper ducts 19-1 through 19-4, positioned as shown in FIG. 3 to generally conform to the upper surface of a typical windrow 11 at the above-mentioned transition region thereof, is great enough to deflect the outwardly propelled seeds over the entire surface of the windrow 11, and carry them up to the inlet of the auger 4. This prevents the loss of sesame seeds that would be tossed clear of the machine without the above-described upper ducts.

It should be appreciated that the upper portion of a windrow is likely to be more dry than the lower portion. The greatest number of seeds tossed upward and outwardly come from the pods in the upper path of the windrow. Some of the tossed seeds fall back on the windrow and, were it not for the air seal of the persent invention, would sift through the windrow and fall through the above-mentioned gaps to the ground, while other seeds are propelled downward by the shock.

The two lower ducts 19-5 and 19-6 are mounted side by side on a channel bracket 48 (FIG. 5) attached to the side brackets of the Renn pickup, in the configuration shown in FIG. 5. The outlet nozzles of the lower ducts 19-5 and 19-6 each have a heighth of three-eighths of an inch and a width of 17 inches in the present embodiment of the invention. These outlet nozzles are aimed slightly upwardly at the surface of the cylindrical inner surface of pickup drum 7, just clear of the tips of the rotating tines 8. A lower rake plate 24, having a plurality of slots 25 through which the tines 8 can pass, is attached to the bottom lips of lower ducts 19-5 and 19-6. The deflection tips 28 of the portions of lower rake plate 24 extending between the tines are bent upward by an angle of approximately 40° relatively to the plane of lower rake plate 24. The clearance between the outer ends of deflection tips 28 and the cylindrical surface of pickup drum 7 is approximately one-eighth of an inch.

The deflection tips 28 cause the air 27 exhausted from the lower ducts to be deflected upward, through the gaps 9 in upper rake plate 6, and also through the clearance gaps between the ends of the fingers of rake plate 9 and the cylindrical surface of the rotary pickup drum 7. The upward stream of air 29 moves with sufficient volume and velocity to prevent any loose seeds in the windrow 11 from falling through such gaps, and furthermore tends to lift the entire windrow 11, somewhat easing its passage over the rake plate and into auger housing 13. We have found that this to some extent reduces the shock imparted to the windrow 11 by the pickup mechanism 7. Some of the seeds forced upward by the jets 29 through the gaps 9 tend to carry seeds entirely through the windrow 11. If this happens, the upper sheet of air 26 deflects such seeds and carries them rearward to the auger 4.

All harvesters having a crop pickup, including the above-mentioned John Deere harvester, due to the way the crop pickup drum 7 has to be placed, have a relatively wide five and one-half inch gap between the left end of the rake plate 6 and the right edge of the auger housing 13, as shown in FIG. 5 to ensure that the crop moving into the auger is fed into the auger at an angle of 90° with reference to the rotation axis of the auger. To prevent loss of a large number of sesame seeds through this gap, a metal seal plate 20 is attached to the rear edge of auger housing 13, as shown, and extends beneath the rear edge of upper rake plate 6. Assist roller 23 performs no function when the Renn pickup mechanism is used to harvest sesame seeds, but for other crops, roller 23 is exposed to the crop material through the above mentioned gap now covered by seal plate 20, and aids rearward movement of the windrow into the auger.

The upward air currents 29 produced from lower ducts 19-5 and 19-6 also force air outward through the gap between seal plate 20 and the rear edge of upper rake plate 6, preventing loss of seeds therethrough.

A typical windrow is 35 to 40 inches wide, although it may be as wide as 60 inches, and typically is 9 to 10 inches high, although it can be substantially less or greater in thickness than this. To produce a 3,000 cubic foot per minute volume of air, the rotor of blower 14 needs to rotate at at least about 3600 rpm. For various windrow characteristics, the optimum placement of the upper ducts can be varied from that indicated in FIG. 3. In the present embodiment of the invention, the bottoms of ducts 19-2 and 19-3 are each about 6 to 8 inches from the surface of the ground, while the bottoms of outer upper ducts 19-1 and 19-4 are approximately 4 to 16 inches from the ground.

Figure 6:
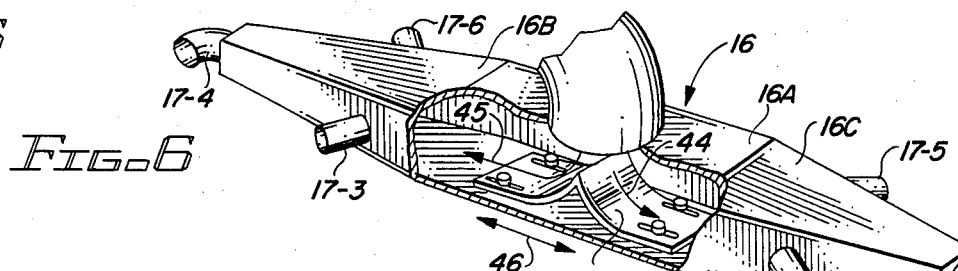
FIG. 6 is a partial cutaway perspective view of a manifold of the machine of FIG. 1.

In addition to providing the above-described configuration and placement of upper and lower ducts, we discovered that it is very important to avoid any pressure buildup of air anywhere in the manifold, hose, and duct system, or else the high velocity sheets of air could not be achieved, regardless of the amount of power input to the blower. The "static" air system shown in FIG. 6, wherein an adjustable, symmetric, peaked baffle 40 is adjustably installed in the inner bottom surface of manifold 16 below 8 inch elbow 17-0 allows the quantity of air to be precisely split into two equal volume, equal velocity portions 44 and 45, which, with the outlets positioned as shown in FIG. 6, allows equal amounts of air to flow through each of the outlets 17-1 through 17-6. We found that if the ducts were designed with the curved cross-sections shown for the upper ducts in FIG. 5, wherein all of the limiting cross-sectional areas within the ducting, hose, and manifold system all have the same total area, then we can obtain sheets of air from the outlets of all six ducts, the velocities of which are proportional to the rpm of the blower 14.

After we finally developed the configuration described above, our testing resulted in a great reduction of the seed loss in harvesting dried windrows of sesame seed. The described device was able to reduce the loss of seed from 20 to 65 percent of the estimated crop down to less than 5 percent of the estimated possible yield, under conditions wherein there was no appreciable wind, the windrows were not rain damaged, and wherein all of the tests were performed on the same variety of seeds. This will greatly increase the profitability of commercially growing sesame seed in the region.

While the invention has been described with reference to a particular embodiment thereof, those skilled in the art will be able to make various modifications to the described structure without departing from the true spirit and scope of the invention.

We claim:

1. A method of preventing loss of seeds from dry, brittle crop material having open pods in windrows, the method comprising the steps of:
   (a) providing a crop pickup mechanism attached to a harvesting machine, the pickup mechanism including a rotary tined pickup drum for lifting windrows, a rake plate adjacent to the pickup drum and having narrow gaps through which tines of the pickup drum pass, the harvesting machine including an auger assembly for receiving lifted windrow material as the harvesting machine moves forward against the windrow;
   (b) rotating the pickup drum so that its tines lift the windrow upward and over the pickup drum and into the auger assembly while the harvesting machine moves forward, the resulting stresses on the windrow causing a large number of seeds to be ejected from the pods in various upward, outward, and downward direction;
   (c) producing a high velocity first sheet of air skimming over the upper surface of the lifted windrow and deflecting the upwardly ejected seeds and carrying them into the auger assembly;
   (d) providing a high velocity second sheet of air beneath the lifted windrow and guiding the second sheet of air so a portion of it passes upward through the gaps, thereby preventing seeds from passing downward through the gaps.

2. The method of claim 1 including positioning a plurality of ducts above and forward of the pickup drum so that the first sheet of air generally conforms to the curved upper surface of a windrow, whereby the first sheet of air deflects seeds ejected upward and outward to the right and left of the direction of travel of the harvesting machine and carries the seeds into the auger assembly.

3. The method of claim 1 including providing a plurality of lower ducts aimed generally at the surface of the pickup drum and providing a lower rake plate attached to an outlet of the lower ducts with gaps through which tines of the pickup drum pass, and deflection tips on the lower rake plate near the surface of the pickup drum for deflecting the second sheet of air upward toward the gaps in the upper rake plate.

4. The method of claim 3 wherein the harvesting machine includes an auxiliary roller located rearward of the rotary pickup drum to guide the windrow rearward into the auger assembly, the method including providing a seal plate covering the auxiliary roller, the method including deflecting a portion of the second sheet of air through gaps between the rear edge of the upper rake plate and the sealing plate to prevent seed from passing downward through that gap.

5. The method of claim 4 including orienting the upper ducts so that the first sheet of air skims along an upwardly sloped portion of the windrow as it passes over the pickup drum.

6. The method of claim 5 including providing a high speed blower, a flexible tube coupling an output opening of the high speed blower to an input opening of a manifold, and coupling inputs of the upper and lower ducts to a plurality of corresponding outlets of the manifold by means of a plurality of flexible tubes.

7. The method of claim 6 including adjusting a peaked baffle in the manifold opposite the inlet thereof to deflect equal portions of air from the blower to opposite portions of the manifold and providing outlet opening areas of the manifold, the total of which equal the area of the inlet to the manifold, and providing the outlet openings of the upper and lower ducts with an area that is equal to the area of the inlet of the manifold to prevent pressurization of air in the manifold and in the ducts.

8. The method of claim 7 wherein the blower produces at least about 3,000 cubic feet per minute of high velocity air.

9. In a machine for harvesting seeds from brittle crop material in windrows, the machine including a rotary pickup drum for lifting the windrows over the pickup drum and feeding it into an auger assembly as the machine moves forward against the windrows, wherein the stresses applied to the windrow during the lifting cause large numbers of seeds to be ejected from open pods as a result of cracking of the stems and the resulting shock to the pods, an air seal apparatus comprising means for producing a high velocity first sheet of air that skims over the surface of the lifted windrow, including the upwardly sloped portion from which seeds begin to fly upwardly and outwardly, with sufficient velocity to deflect the flying seeds rearward into the auger assembly, and means for producing a second high velocity sheet of air beneath the lifted windrow and guiding the second sheet of air so that it passes at high velocity upward through gaps between the pickup drum and a rake plate over which the lifted windrow passes.

10. In the machine of claim 9, the air seal apparatus wherein the rake plate includes a plurality of fingers between the gaps through which the tines pass, the ends of the fingers having a predetermined clearance from the surface of the rotary drum, the means further including four curved upper ducts having outlet slots positioned forwardly of the pickup drum, two of the upper ducts being disposed generally symmetrically about an upper portion of the windrow and the two other upper ducts being disposed lower than the two center ducts over the outer edges of the windrow, the four ducts providing a curved configuration of the first sheet of air that generally conforms to the curved upper surface of the windrow as it is lifted over the pickup drum.

11. In the machine of claim 10, wherein two of the lower ducts have outlet slots aimed at the surface of the pickup drum, the air seal apparatus including a pair of lower rake plates that are attached to the outlet ends of the lower ducts and include fingers that extend between gaps through which the tines of the rake plates pass as it rotates, the fingers including upwardly inclined deflection tips that aim the lower sheet of air upward through the gaps in the upper rake plate.

12. In the machine of claim 11, the air seal apparatus including a high speed air blower, a tube conducting the outlet of the blower to an inlet of a manifold, the manifold including six outlets and six flexible tubes connecting the manifold outlets to the four upper ducts and the two lower ducts, the total area of the manifold outlets being equal to the area of the manifold inlet, and the total area of the outlet slots of the four upper ducts and two lower ducts being equal to the inlet areas thereof and to the area of the manifold inlet, to thereby provide static, unpressurized high velocity flow of air from the blower outlet through the outlet slots of the upper and lower ducts.

13. In the machine of claim 12, the air seal apparatus wherein the outlet blower produces an outlet volume of at least about 3,000 cubic feet per minute, and wherein the outlet slots of each of the upper ducts is one-half of an inch by 16 inches, and wherein the outlet slots of each of the lower ducts is three-eighths of an inch by 17 inches.

14. In the machine of claim 13, the air seal apparatus wherein the manifold includes a centered inlet and a movable, peaked baffle disposed inside the manifold generally opposite to the inlet thereof and adjustable in position to equally divide the incoming air into two airstreams, each moving in opposite directions into respectively opposite portions of the manifold.

* * * * *